United States Patent [19]

Cavallin

[11] Patent Number: 4,855,155

[45] Date of Patent: Aug. 8, 1989

[54] SWEETS AND PROCESS FOR THEIR MANUFACTURE

[75] Inventor: Riccardo Cavallin, Stadtallendorf, Fed. Rep. of Germany

[73] Assignee: Ferrero oHG m.b.H., Fed. Rep. of Germany

[21] Appl. No.: 86,547

[22] Filed: Aug. 18, 1987

[30] Foreign Application Priority Data

Aug. 19, 1986 [DE] Fed. Rep. of Germany ....... 3628011

[51] Int. Cl.$^4$ .......................... A23G 3/00; A23C 23/00
[52] U.S. Cl. ..................................... 426/564; 426/572; 426/583; 426/660; 426/659
[58] Field of Search ............... 426/572, 660, 583, 564, 426/659

[56] References Cited

U.S. PATENT DOCUMENTS

| | | | |
|---|---|---|---|
| 4,120,987 | 10/1978 | Moore | 426/572 |
| 4,150,163 | 4/1979 | Peterson | 426/583 |
| 4,298,625 | 11/1981 | Cillario | 426/572 |
| 4,668,520 | 5/1987 | Okonozi et al. | 426/572 |
| 4,670,272 | 6/1987 | Chen et al. | 426/572 |
| 4,707,374 | 11/1987 | King et al. | 426/572 |
| 4,711,788 | 12/1987 | Porcells et al. | 426/572 |

FOREIGN PATENT DOCUMENTS 3015825 3/1981 Fed. Rep. of Germany .
1261910 1/1972 United Kingdom .

*Primary Examiner*—Jeanette Hunter
*Attorney, Agent, or Firm*—Bernard, Rothwell & Brown

[57] ABSTRACT

A soft, aerated sweetmeat comprising an oil-in-water emulsion of quarg or yoghurt, milk, fat, sugar, starch and water wherein the product is prepared, in part, by homogenizing, pasteurizing and then aerating the resulting mixture.

13 Claims, No Drawings

SWEETS AND PROCESS FOR THEIR MANUFACTURE

The invention relates to sweetmeat in the form of a soft inert gas-foamed substance based on an oil-in-water emulsion and containing milk ingredients, fat component/components, sugar, starch product(s) and water. The invention particularly relates to a protein-containing sweetmeat the consistency of which may reach from a spreadable creme to a sliceable paste of relatively high density.

DE-PS 30 15 825 describes a sweetmeat in form of a foamed substance consisting of similar components while in its pH-value as well as its individual production steps being significantly different from the sweetmeat according to this invention.

In GB-PS 1 261 910 a process is described where lactic acid-producing thermo-bacteria are incubated in a watery dispersion of milk protein and lactose from powdered skimmed milk. By adding a nutrient fat one obtains a sour emulsion which is pasteurized and subsequently foamed up with the help of an inert gas. This way a spreadable cream-like substance having a sour pH-value is obtained. Due to the absence of carbohydrates, however, the nutritional value of the product is low which is a disadvantage of it.

It is the objective of the invention to use milk for creating a sweetmeat containing all salts, proteins and lactose normally present in milk, which is an oil-in-water emulsion retaining its original shape and offering extended durability and which, because of its slightly sour taste, will suit the taste preference of a number of consumers.

Furthermore it is intended that, at final consuming temperature, the fat components and lactose will be present in crystalline form while, at the same time, the consumer should not be able to perceive any individual crystals. For example, the sugar contained in the finished product should be crystallized in such fine form that it is not possible to sense by taste any individual sugar crystals.

As for the manufacturing process of the sweetmeat it is furthermore intended to replace the (sugared) condensed milk either entirely or in part with fresh whole milk. This is of importance as the use of fresh whole milk permits the elimination of the use of microcrystalline lactose (doting crystals).

In addition to the above the sweetmeat, according to the invention, in spite of its relatively high degree of moisture of about 46 to 48%, shall retain such stability of shape that there will be no curdling of it in the pasteurizing process.

The invention is based on the recognition that, by means of combining a number of finely adjusted production steps and a preset pH-value of 4.2 to 5.0 for the product, one obtains a product that will not only be stable in shape but also offer an extended durability while, at the same time, representing the solution of the objective described above.

The sweetmeat of the type described above is characterized in that it is obtained by means of the following production steps:

(a) Preheating of quarg or yoghurt or a blend of both at a temperature between 40° and 50° C.; and
(b) Stirring in of fresh whole milk or condensed milk in order to obtain blend A;
(c) Homogeneous mixing of sugar and starch product(s) in order to obtain the dry premix B;
(d) Preparation of a pasty substance C from the fat component(s) at temperatures between 50° to 75° C.;
(e) Mixing the blend A with the dry premix B; thereafter
(f) Admixture of the pasty substance C under constant stirring at a temperature between 50° and 60° C.;
(g) Then the addition of aromatic substances and an acid enhancer until a pH-value of 4.2 to 5.0 is reached, to be followed by a homogeneous mixing process of 20 to 25 minutes at temperatures between 50° and 60° C.;
(h) Pasteurizing the mixture at a temperature between 95° and 110° C. for not more than 20 seconds; thereafter
(i) Cooling down the mixture to a temperature between 40° and 60° C.;
(j) Foaming up the mixture by inert gas injection while, at the same time, attaining and retaining a creamy quality of the substance;
(k) Crystallizing of at least part of the fat component/components and the sugar under stirring and cooling down the creamy substance to not more than 20° C.

At the production step (a), according to the invention, the ingredients quarg or yoghurt or a blend of both which are supplied at temperatures between +8° and +12° C. are weighed and preheated at temperatures between 40° and 50° C. while still in the weighing vessel.

Then condensed milk, preferredly sugared condensed milk and particularly condensed milk obtained from skimmed milk, or fresh whole milk, are admixed to the blend above under constant stirring (at 22/11 RPM) and heated in the mixing vessel at a temperature of 60° C.

At the same time a dry premixer is used for the homogeneous mixing of the dry components i.e. sugar and starch products to obtain the dry premix B. A suitable starch product is, at least in part, a flour from ground kernels of the beans of the carob tree. It is also possible at this step to add auxiliary materials and aromatic substances to this dry premix such as vanillin and DP-45. Due to the homogeneous premixing of the dry components the forming of lumps in the subsequent process steps is parctically eliminated.

At the same time a fat preparation is obtained under constant stirring at temperatures between 50° and 75° C. The fat components particularly suitable are butter fat and Falex and also an addition of Dimutan ST. When adding Dimutan ST it is of advantage to melt it at a temperature of about 70° C. and admix it to the above fat mixture under constant stirring for about 2 to 3 minutes (22/11 RPM).

In the following step the blend A is mixed with the dry premix B, to be followed by the admixture of the pasty fat preparation C under constant stirring (22/11 RPM) at temperatures between 50° and 60° C., preferredly 55° to 60° C.; the following period of about 15 minutes is used to have the mixture become emulsified.

At the next production step there will be the admixture of aromatic substances; an acid enhancer is added until a pH-value of 4.2 to 5.0, preferredly 4.5 to 4.8, is reached. The aromatic substances particularly suitable include quarg aroma, lemon aroma as well as the addition of alcohol, particularly of brandy. The lactic acid is added in the form of a solution or rather suspension with the volumetric contents of 50% purest lactic acid and 50% water.

The mixture thus obtained at this point is then worked into a homogeneous mass. It is of advantage to attain this objective with the help of a corundum mill being integrated into the pipe system and leading to a heatable buffer vessel with an agitating device (Corundum mill with 300 RPM; slot width 0.05 to 1.20; stirring device 22/11 RPM; heated with water of 80° C.). At this production step (g) the temperature of the product mix will be preferredly 55° C. and is maintained at this level throughout the entire step.

The next production step provides the pasteurization of the mixture at temperatures between 95° and 110° C. for a period not exceeding 20 seconds. As an example, the pasteurization may be carried out in a cylindric vessel being fitted on the inside with a rotating knife shaft with scraping blades attached to it. The speed of said shaft should be adjustable (400 RPM). The cylinder is heated indirectly by means of steam. The temperature of the pasteurizing process must reach 95° C.±1° C. and it must be made sure that the product is exposed to it for a period of 15 seconds.

The subsequent process step uses a cylinder of identical design however directly cooled with water of e.g. 11° C. in order to cool down the product to a temperature between 40° and 60° C., preferredly 60° C.

In the working cylinder of the subsequent production step the mixture is foamed up by means of inert gas, preferredly nitrogen, being injected. Instead of having a knife shaft it is preferred that this cylinder has an integrated pin shaft ensuring a very fine distribution of the nitrogen introduced into the pipe system.

At the next production step at least part of the fat component(s) and of the sugar is crystallized under stirring and the creamy mass being cooled down to a temperature not exceeding 20°, preferredly 16° C. This production step is recommended to be carried out with cylinders using knife shafts; the cylinders proper are cooled by means of a brine flow having a temperature of minus 17° C. The speed inside these cylinders is 400 RPM.

The entire hereabove described system for pasteurizing, foaming and cooling is commonly charged with an interior pressure build-up of about 2 to 8 bar. Due to the addition of nitrogen after the pasteurization phase and the cooling after the foaming process the fat ingredients in the creamy product mass will crystallize, thus solidifying the emulsion to acquire a stable creamy shape and structure. The cream thus obtained is then run to the dosing machine via a tempered double-walled pipeline.

The resulting cream is particularly suitable as filling cream for Viennese Mass sweetmeats and biscuit cakes.

EXAMPLE

According to the preceding observations and under consideration of the features and values specified as preferred a filling cream was manufactured having the specifications set forth in the table below:

TABLE OF SPECIFICATIONS

| Features | Product Mixture | Finished cream |
| --- | --- | --- |
| pH-value | 4.3–4.5 | 4.3–4.5 |
| Viscosity | *1.0 M–2.0 M | **50.0 M–100.0 M |
| Water content | 47.5%–49.0% | 46.0%–48.0% |
| Fat (total) | 25.0%–27.0% | 25.0%–27.0% |
| Saccharose | 17.0%–19.0% | 17.0%–19.9% |
| AW-value | 0.94–0.97 | 0.92–0.96 |
| Protein (total) | 6.0%–7.0% | 6.0%–7.0% |
| Density | — | 0.70–0.62 |

Note:
*Brookfield spindle RVS; speed 50
**Brookfield spindle F; speed 2.5

In spite of its relatively high moisture content of 46% to 48% the filling cream demonstrated a stable consistency and could be stored over an extended period of time ( . . . ).

I claim:

1. A soft, aerated sweetmeat comprising an oil-in-water emulsion of 6.0–7.0% milk products, 25.0–27.0% fat, 17.0–19.9% sugar, starch and 46–48% water produced by:
    (a) preheating quarg or yoghurt or a blend of both at temperatures of from 40° to 50° C.;
    (b) adding whole or condensed milk with stirring to obtain a blend A;
    (c) homogeneously mixing sugar and starch to obtain a dry mix B;
    (d) preparing a paste C by stirring the fat at temperatures of from 50° to 75° C.;
    (e) mixing blend A with the dry premix B; thereafter
    (f) mixing the paste fat C with stirring with the mixture of step (e) at temperatures of from 50° to 60° C.;
    (g) subsequently adding aromatic substances and an acid enhancing agent until a pH-value of 4.2 to 5.0 is reached, followed by stirring for 20 to 25 minutes at temperatures of from 50° to 60° C. to obtain a homogeneous mixture;
    (h) pasteurizing the mixture at temperatures of from 95° to 110° C. for a period not exceeding 20 seconds; and
    (i) cooling the mixture to between 40° and 60° C.;
    (j) aerating the mixture by injecting inert gas therein thereby attaining and maintaining a creamy texture;
    (k) crystallizing at least part of the fat and the sugar under stirring, and cooling the creamy substance to not more than 20° C.

2. A sweetmeat as claimed in claim 1 wherein the starch may, at least in part, consist of flour obtained from the kernels of the carob tree bean.

3. A sweetmeat as claimed in claim 1 wherein the fat may consist of vegetable fat and/or butter.

4. A sweetmeat as claimed in claim 1 wherein lactic acid is used as the acid enhancing agent.

5. A sweetmeat as claimed in claim 4 wherein the lactic acid is added in a volumetric ratio of lactic acid to water of 50:50.

6. A sweetmeat as claimed in claim 1 wherein the acid enhancing agent is added until a pH-value of 4.5 to 4.8 has been reached.

7. A sweetmeat as claimed in claim 1 wherein the inert gas is nitrogen.

8. A sweetmeat as claimed in claim 1 wherein at step (j) the inert gas pressure is from 2 to 8 bar.

9. A sweetmeat as claimed in claim 1 wherein vanillin and/or DP 45 is added to the dry mix B.

10. A sweetmeat as claimed in claim 1 wherein the aromatic substances added at step (g) may include lemon aroma, quarg aroma, vanillin or brandy.

11. A sweetmeat as claimed in claim 1 wherein the temperature is preset and maintained as follows: step (a): 55° C.; step (b): 60° C.; steps (d) and (e): 60° C.; step (g): 55° C.; step (h): 95° C.; step (k): 16° C.

12. A sweetmeat as claimed in claim 1 wherein stirring periods are preset as follows: step (b): 10 to 15 minutes; step (d): 2 to 3 minutes; step (f): 15 minutes; step (g): 22 minutes; step (h): 15 seconds.

13. The process of producing a sweetmeat comprising
  (a) preheating quarg or yoghurt or a blend of both at temperatures of from 40° to 50° C.;
  (b) adding whole or condensed milk with stirring to obtain a blend A;
  (c) homogeneously mixing sugar and starch to obtain a dry mix B;
  (d) preparing a paste C by stirring the fat at temperatures of from 50° to 75° C.;
  (e) mixing blend A with the dry premix B; thereafter
  (f) mixing the paste fat C with stirring with the mixture of step (e) at temperatures of from 50° to 60° C.;
  (q) subsequently adding aromatic substances and an acid enhancing agent until a pH-value of 4.2 to 5.0 is reached, followed by stirring for 20 to 25 minutes at temperatures of from 50° to 60° C. to obtain a homogeneous mixture;
  (h) pasteurizing the mixture at temperatures of from 95° to 110° C. for a period not exceeding 20 seconds; and
  (i) cooling the mixture to between 40° and 60° C.;
  (j) aerating the mixture by injecting inert gas therein thereby attaining and maintaining a creamy texture;
  (k) crystallizing at least part of the fat and the sugar under stirring, and cooling the creamy substance to not more than 20° C.

* * * * *